UNITED STATES PATENT OFFICE.

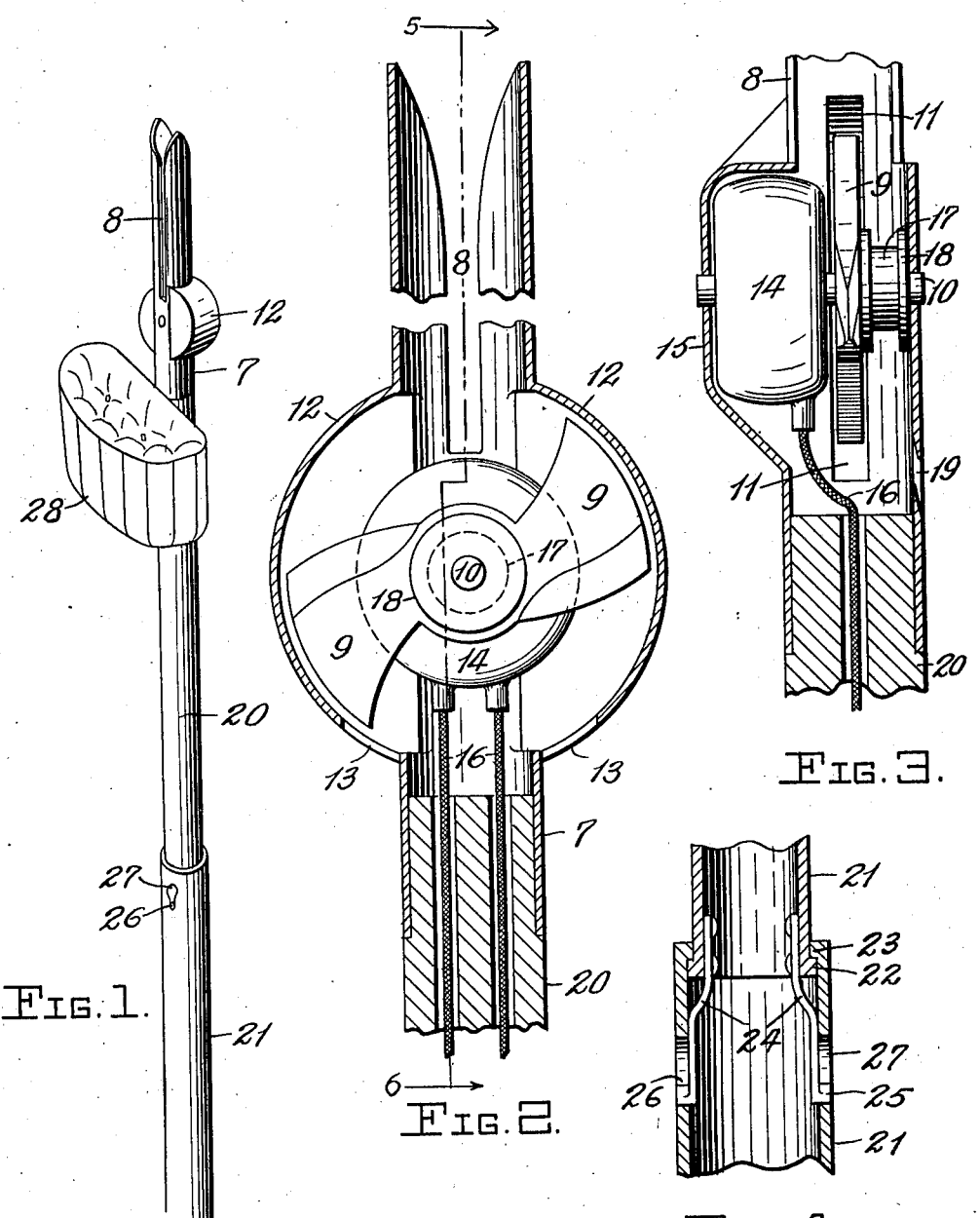

ANDREW MURDOCH, OF ANCON, CANAL ZONE.

FRUIT-PICKER.

1,026,996. Specification of Letters Patent. Patented May 21, 1912.

Application filed February 15, 1909. Serial No. 477,959.

*To all whom it may concern:*

Be it known that I, ANDREW MURDOCH, of the town of Ancon, Canal Zone, Isthmus of Panama, have invented certain new and useful Improvements in Fruit-Pickers, of which the following is a full, clear, and exact description.

My invention relates to improvements in fruit pickers and the object is to provide a simple and inexpensive device by means of which a person standing on the ground will be enabled to pick fruit from any part of a tree without bruising or injuring the fruit, or breaking the tree. To accomplish this object I provide an extensible handle carrying at its upper end a tubular member containing a stem severing mechanism. A padded basket is located so that the fruit when picked drops only a few inches thereinto.

In the drawings which illustrate my invention:—Figure 1 is a perspective view of the device with the handle extended in operative position. Fig. 2 is a sectional view showing the arrangement of the rotary cutter and driving mechanism therefor. Fig. 3 is a sectional view on the line 5—6, of Fig. 2. Fig. 4 is a detail sectional view of one of the handle joints.

In the above defined figures, 7 designates a tubular member having slots 8, diametrically opposite each other, in the upper portion thereof. The slots 8 widen toward the upper extremity of the tube in order that a fruit stem may readily enter the same. A short distance below the slots a revoluble knife or cutter 9 is mounted on a shaft 10. The knife may be of any suitable form, but it is preferable to make the same in such a manner that the weight is as far as possible from the center in order that the momentum of the blade when rapidly revolved will aid in forcing the knife through the stem to be cut. The knife operates through slots 11 formed in the tube 7, the slots being covered by housings 12 which prevent the knife from cutting anything not introduced into the slots 8. Openings 13 are provided in the bottom of the housings 12 to permit the escape of stems or leaves carried in by the knife.

A small electric motor 14 is mounted in the shaft 10 within a casing 15, which may be frusto-conical, as seen in Fig. 3, to prevent the same catching on branches as the device is raised or lowered through the tree. The conductors 16 carrying the current for the motor extend through the handle as seen in the drawings.

The hub 17 of the knife is provided with flanges 18 in order that a cord may be attached thereto and the device operated manually if the motor becomes inoperative or if there is no source of electric current available. An aperture 19 is provided in the tube, under the hub 17, for the passage of a cord.

The upper section 20 of the handle may be solid, as shown, or may be tubular, as are the remaining sections 21. The lower end of one section of the handle is provided with an external collar or flange 22, over which the next section slides. The upper end of the next section is provided with an internal collar 23 which slides on the first section and engages the collar 22 thereof to prevent the sections becoming disconnected. The lower end of each section is equipped with a pair of spring fingers 24, each finger terminating in a pin 25 adapted to enter an opening 26 in the next section, when the sections are extended to the full limit. The openings 26 are enlarged at 27 sufficiently to allow the fingers of the operator to press the springs 24 together thus withdrawing the pins 25 from the openings 26, when it is desired to shorten the handle. A padded basket 28 is attached to the top section of the handle immediately below the tube 7.

The operation of the device consists in adjusting the handle to any desired length and then raising the device so that the stems of the fruit to be picked are caught in the slots 8 and the fruit hangs over the basket 28. When the device is sufficiently elevated the stem of the fruit comes in contact with the rapidly revolving knife and is severed thereby so that the fruit drops only a few inches into the basket and is unharmed. When the basket becomes filled it may be lowered and the contents removed without damage.

The advantages of this device will be appreciated by fruit growers. A person standing on the ground can quickly and easily pick fruit from all parts of a tree without damaging either the fruit or the tree. Different cutters may be used to suit different kinds of fruit. All the moving parts of the device are protected to prevent clogging with leaves, et cetera, and any portions of stem or leaves carried into the housing by the knife will escape through the openings in the bottom thereof. The handle may be lengthened to suit any height of tree by simply pulling out the sections as needed. When not in use the device telescopes into a small, compact article which may be stored or carried with ease.

By the use of this device a great saving will be effected over the ordinary method of hand picking from a ladder. A person working on a ladder vibrates the tree sufficiently to knock off considerable of the riper fruit which is lost by reason of bruising or breakage due to its fall.

Having thus described my invention, what I claim and desire to secure by Letters Patent is:—

1. A fruit picker comprising a handle, a tube at the top of said handle having opposite narrow parallel sided slots to receive fruit stems, a peripherally weighted cutter revolubly mounted in said tube to pass the slots thereof, a motor mounted at one side of said cutter, a flanged pulley at the other side thereof, a single shaft supporting said motor, cutter and pulley and an enlargement of said tube forming a protective housing for the cutter, motor and pulley, said housing having apertures in the bottom thereof to permit the escape of leaves and twigs.

2. A fruit picker comprising a telescopic handle having sprung catches in its upper members positioned to engage apertures in its lower members, said lower members having finger slots to allow the release of the catches, a tube at the top of said handle having opposite narrow parallel sided slots to receive fruit stems, a peripherally weighted cutter revolubly mounted in said tube, to pass the slots thereof, a motor mounted at one side of said cutter, a flanged pulley at the other side thereof, a single shaft supporting said motor, cutter and pulley and an enlargement of said tube forming a protective housing for the cutter, motor and pulley, said housing having apertures in the bottom thereof to permit the escape of leaves and twigs.

In witness whereof I have hereunto set my hand in the presence of two witnesses.

ANDREW MURDOCH.

Witnesses:
JOHANNES T. JENSEN,
WILLIAM D. JEFFRIES.